Figure 1:
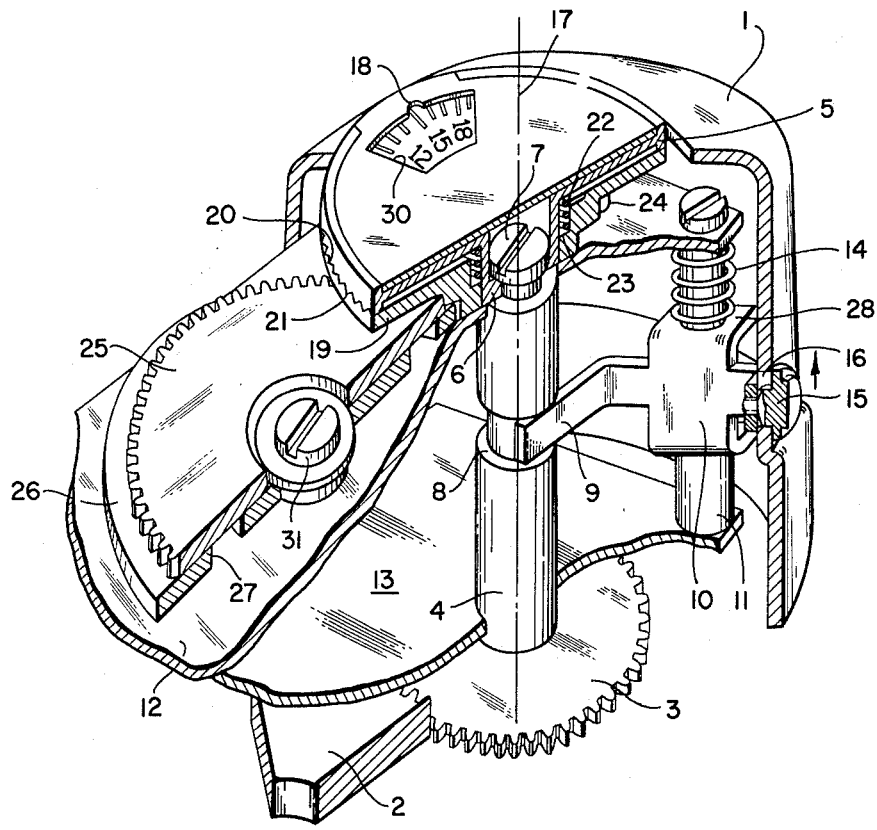

May 18, 1965  K. STEISSLINGER  3,183,807
FILM SPEED SETTING DEVICE FOR CAMERAS
Filed Aug. 27, 1962

KURT STEISSLINGER
INVENTOR.

BY
ATTORNEY & AGENT

3,183,807
FILM SPEED SETTING DEVICE FOR CAMERAS
Kurt Steisslinger, Stuttgart-Hedelfinger, Germany, assignor to Eastman Kodak Company, Rochester, N.Y., a corporation of New Jersey
Filed Aug. 27, 1962, Ser. No. 219,414
5 Claims. (Cl. 95—10)

The invention relates to a photographic camera having a photoelectric exposure control system and more particularly to a camera having means for adjusting such exposure control system according to the speed of the photosensitive film to be utilized.

Among cameras having photoelectric exposure control systems, one type is provided with means for variably positioning an index plate relative to a film speed scale for selecting the desired film speed number. The indicating needle of an integral light meter can be aligned with the selected film speed number to identify the proper setting of the diaphragm opening and/or the shutter speed.

More advanced cameras are provided with means for presetting a diaphragm-shutter relation, directly or indirectly, according to the selected film speed, with subsequent, actual setting of the diaphragm aperture and the shutter speed as a function of scene brightness and in accordance with the preset diaphragm-shutter relation. The present invention is most suitable in this type of camera wherein the presetting operation adjusts the position of the measuring instrument of an integral exposure meter or follow-up pointer for use with a light meter.

An important object of the present invention, therefore, is to provide a device for presetting a selected film speed, thereby selectively presetting a diaphragm-shutter relation that will be a function of scene brightness.

Another object of the invention is to provide a film speed setting and indicating device which can be coupled to the adjusting mechanism that determines the diaphragm opening and/or shutter speed as a function of scene brightness.

Yet another object of the invention is to provide a film speed setting device comprising a film speed scale plate and an index plate as a part of the mechanism for determining the diaphragm-shutter relation wherein the plates are coupled to transmit the diaphragm-shutter relation to the meter and uncoupled to preset the selected film speed.

And still another object of the invention is to provide an actuating means that is accessible from the outside of the camera body for uncoupling the scale plate and index plate for selecting the film speed by moving one plate relative to the other plate.

These and other objects and advantages will be apparent to those skilled in the art from the following detailed description.

Figure 2:
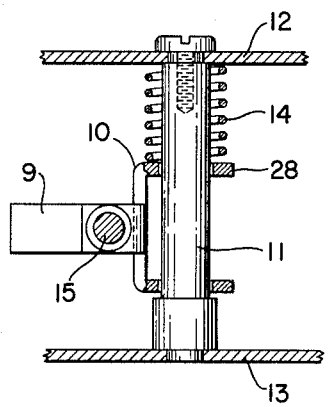

Reference is now made to the accompanying drawing wherein like reference numerals designate like parts and wherein:

FIG. 1 is a perspective and partially sectional view of a camera having the preferred embodiment of the invention incorporated therein, and showing the film speed setting means and the immediately adjacent parts of the mechanism for transmitting the film speed setting to the exposure meter; and FIG. 2 is a detail elevation view, partially in section, showing the arrangement of the actuating member and its related parts.

As shown, numeral 1 represents a partial section of a camera body, for example, the upper right-hand end. The shutter and diaphragm mechanisms are not shown but can comprise any well-known type, such as an iris diaphragm or a shutter having pivotally movable blades as is well-known in the art. Gear 2, which is only partially shown, is part of the means for selecting the film speed setting and can be independent of the diaphragm and shutter or can be operatively connected to the diaphragm and/or shutter setting mechanism in a manner known in the art.

Cooperating with the gear 2 is another spur gear 3 that is mounted on one end of a rotatable and axially movable shaft 4. For reasons to be described hereinafter, gear 3 is of less thickness than gear 2. Axially mounted on the other end of shaft 4 is a support member 5 having a central sleeve portion 6 which is fixed to the upper end of shaft 4 by the screw 7 as shown in the drawing.

Shaft 4 is provided with an annular recess 8 intermediate its ends. Lug or extension 9 of the actuating member 10 engages the recess 8 for moving the shaft 4 in an axial direction for the purpose to be described hereinafter. Actuating member 10 is slidable axially along guide post 11 which is mounted between the spaced support plates 12 and 13 by means of screws as shown. A spiral spring 14 is mounted on the post 11 between plate 12 and flange 28 on actuating member 10 and normally urges said actuating member in a downward direction. Actuating member 10 carries an integral button 15 that extends through the elongated slot 16 in the camera body, so as to be accessible from the outside thereof. As is readily evident, the movement of the actuating member 10 is limited by the movement of the button 15 in the slot 16.

Support plates 12 and 13 provide the bearing surface for the shaft 4 and limit the axial movement of said shaft by acting as a stop for gear 3 in an upward direction and for support member 5 in a downward direction. Gear 3 and support member 5 have a separation greater than support plates 12 and 13 by an amount equivalent to the length of slot 16.

An index plate 17 is fixed to the upper surface of support member 5 and is provided with an aperture 30 having an index mark 18, the aperture 30 being aligned with a similar aperture in plate member 5. Sleeve portion 6 provides a bearing for a scale plate 19 which is freely mounted on said sleeve portion. Scale plate 19 includes the film speed markings DIN and/or ASA which are well-known in the art. The apertures in plate member 5 and index plate 17 provide visual access to the scale markings on the plate 19. Annular teeth 20 on support member 5 and 21 on scale plate 19 are provided for interlocking plate 19 to plates 5 and 17 so that said plates are movable as a unit when said teeth are in engagement. A spring 22 surrounds the sleeve portion 6 between the shoulder 23 of plate 19 and the bottom surface of plate member 5 to bias said plates apart. In the preferred embodiment, spring 14 exerts a force against actuating member 10 which is greater than and opposed to that of spring 22 whereby shaft 4 is normally urged in a downward direction so that teeth 20 and 21 are normally engaged, the movement being limited by the length of slot 16 and the lower bearing portion of the sleeve 6 against the support plate 12. Index plate 19 also carries an integral gear portion 24 which meshes with spur gear 25 that is rotatably mounted on stud 31. A cam plate 26 having a spiral slot 27 is fixed to gear 25 for controlling the position of the indicator needle of the light measuring device in a manner known in the art.

Movement of the button 15 in the direction indicated by the arrow A will raise the shaft 4 as well as the gear 3, plate member 5 and index plate 17 so that teeth 20 and 21 are then disengaged. Spring 22 will continue to urge scale plate 19 in a downward direction against support plate 12 thereby retaining the gear portion 24 and spur gear 25 in meshing relation. Gear 2 has a thickness greater than gear 3 so that these gears will always remain in meshing relation irrespective of the axial position of shaft 4.

When it is necessary to reset the film speed, button 15 is moved in the direction of arrow A. Actuating member 10 is then moved upward against the force of spring 14 and lug 9 raises shaft 4 an equivalent distance. At this point the teeth 20 and 21 become disengaged and a suitable knob on the camera, the diaphragm, or the shutter speed setting ring which is connected to gear 2 can then be actuated to position index 18 relative to the proper ASA or DIN number as a function of the diaphragm-shutter relation. This motion is transmitted through gears 2 and 3 to shaft 4 and index plate 17 so as to position index mark 18 opposite the figure on the scale plate 19 corresponding to the desired film speed number. The button 15 is then released whereupon spring 14 urges actuating member 10 and shaft 4 downwardly until the teeth 20 and 21 are again in engagement. Further movement of the diaphragm setting ring or the shutter speed setting ring to preset a desired diaphragm-shutter relation is transmitted through gear 2, gear 3, shaft 4, the intermeshed teeth 20 and 21, and spur gear 24, through the spur gear 25 and cam plate 26 to adjust the position of the indicator needle in accordance with the desired diaphragm-shutter relationship, the set or selected film speed number remaining constant and always visible to the operator.

It is to be understood that the invention can take a form other than that disclosed and described herein as a preferred embodiment and that various changes in the shape, size, and arrangement of the parts can be resorted to without departing from the spirit of the invention or the scope of the appended claims.

I claim:

1. A film speed setting device for a camera having an automatic exposure control system responsive to scene light, comprising in combination:
   a support member adapted to be rotated and to be moved axially between a control position and a selecting position;
   an index member fixed to said support member for movement therewith;
   a film speed scale member freely mounted coaxially with said support member and coupled to said exposure control system;
   means releasably coupling said index member and said scale member for movement as a unit with said support member so long as said support member is in said control position;
   manually operable means coupled to said support member for moving said support member axially to said selecting position in which said coupling means is released and only said index member is movable with said support member; and
   means coupled to said support member for rotating said support member and said index member to position said index member relative to said scale member and in relation to a selected film speed number when said support member is in said selecting position and for rotating said support member, said index member and said scale member as a unit to adjust said exposure control system as a function of the selected film speed number when said support means is in said control position.

2. A film speed setting device in accordance with claim 1 wherein said coupling means comprises annular teeth on said index member and on said scale member, said teeth being biased into engagement so long as said support member is in said control position.

3. A film speed setting device in accordance with claim 1 and including a first resilient means arranged between said index member and said scale plate for biasing said index member in an axial direction away from said scale plate and a second resilient means arranged with respect to said manually operable means for biasing said support member in an axial direction to overcome said first resilient means whereby said coupling means is maintained so long as said support member is in said control position.

4. A film speed setting device in accordance with claim 1 wherein said support member is provided with an annular recess and said manually operable means is movable along an axis parallel to and spaced from the axis of said support member and comprises an operating portion arranged externally of said camera and an actuating portion in engagement with said annular recess.

5. A film speed setting device in accordance with claim 3 wherein said film speed scale member is arranged below said index member and said first resilient means releases said coupling means when said support member is moved to said selecting position by said manually operable means.

References Cited by the Examiner

UNITED STATES PATENTS 2,975,687   3/61   Greger _____ 95—10

NORTON ANSHER, *Primary Examiner.*

D. B. LOWE, *Examiner.*